April 7, 1953        E. WILDHABER        2,633,775
METHOD AND APPARATUS FOR PRODUCING GEARS
Filed June 26, 1947        3 Sheets-Sheet 1
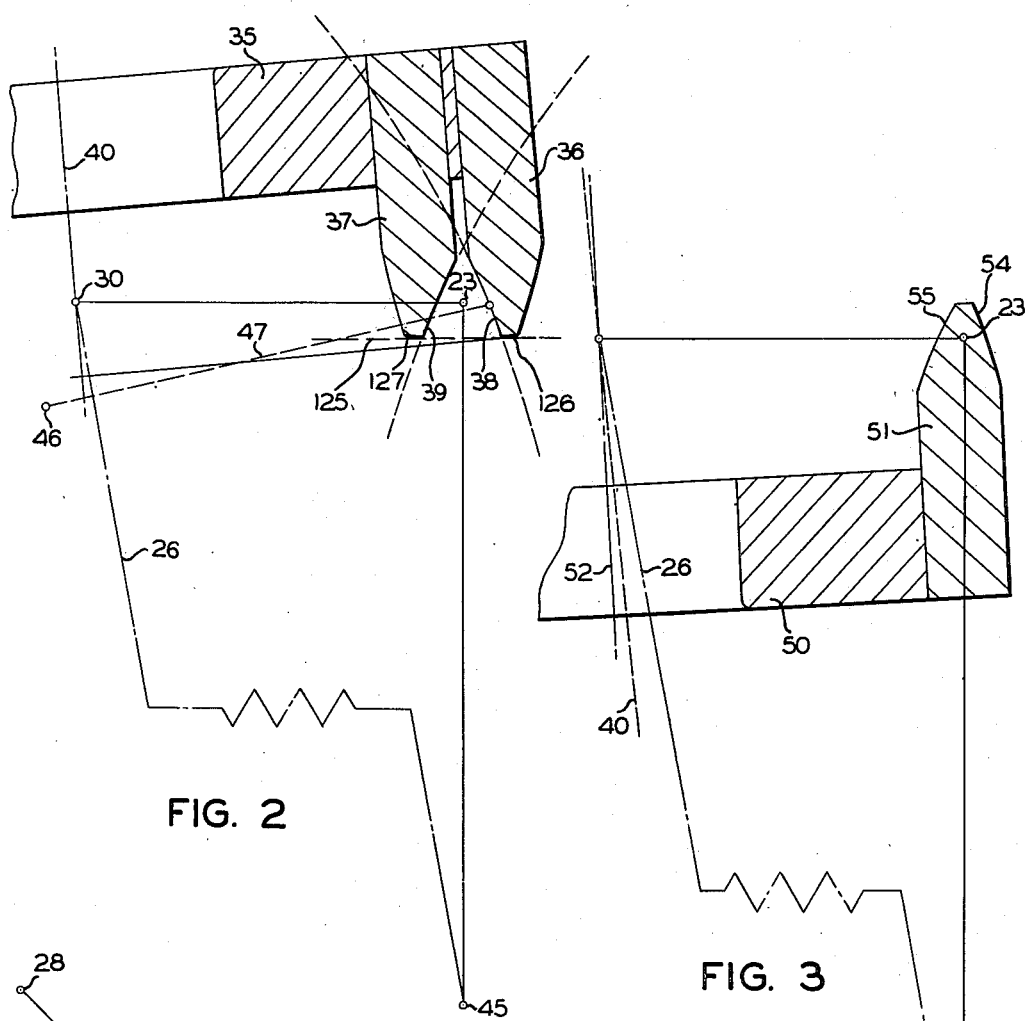
FIG. 2
FIG. 3
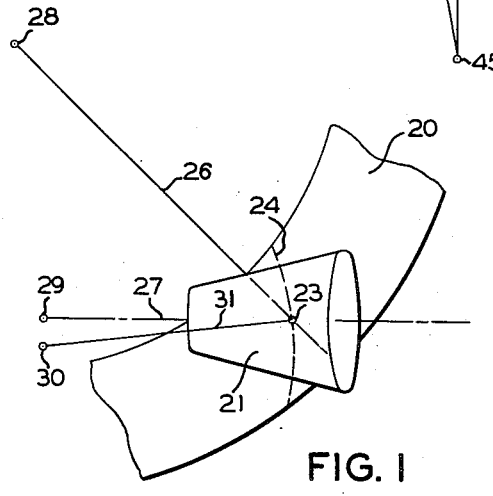
FIG. 1
Inventor
ERNEST WILDHABER
By
Attorney April 7, 1953     E. WILDHABER     2,633,775
METHOD AND APPARATUS FOR PRODUCING GEARS
Filed June 26, 1947     3 Sheets-Sheet 2

Inventor
ERNEST WILDHABER

By *B. E. Schlesinger*
Attorney

April 7, 1953 E. WILDHABER 2,633,775
METHOD AND APPARATUS FOR PRODUCING GEARS
Filed June 26, 1947 3 Sheets-Sheet 3

Inventor
ERNEST WILDHABER
By
Attorney

Patented Apr. 7, 1953

2,633,775

UNITED STATES PATENT OFFICE 2,633,775

METHOD AND APPARATUS FOR PRODUCING GEARS

Ernest Wildhaber, Brighton, N. Y., assignor to Gleason Works, Rochester, N. Y., a corporation of New York Application June 26, 1947, Serial No. 757,146

15 Claims. (Cl. 90—5)

The present invention relates to the production of gears and particularly to the cutting of longitudinally curved tooth gears with cutters of the face-mill type. More specifically, the invention relates to the production of hypoid gears although it may be applied also to the cutting of spiral bevel and of longitudinally curved tooth spur gears.

In cutting longitudinally curved tooth gears, the conventional practice is to cut both sides of each tooth space of the gear or larger member of the pair simultaneously with a male cutter and to cut the tooth spaces of the pinion or smaller member of the pair one side at a time also with a male cutter. In this way not only can a high rate of production be achieved but the two sides of the pinion teeth can be cut to have radii of lengthwise curvature which mismatch to any desired degree the mating tooth surface of the gear with the result that any desired amount of localization of lengthwise tooth bearing or contact may be obtained when the pair of gears are in mesh. Localization of bearing permits the gears to accommodate themselves to any variations in mountings or loads which they may encounter in use.

There have been various proposals made from time to time to cut both sides of the tooth spaces of each member of a pair of longitudinally curved tooth gears simultaneously, for this would further speed up production. It has been proposed, for instance, to cut both sides of each tooth space of the larger member simultaneously with a conventional male cutter and, to achieve conjugacy, to cut both sides of each tooth of the pinion or smaller member of the pair simultaneously with a female or straddle cutter whose cutting surfaces are a counterpart of the cutting surfaces of the male cutter. With such methods as have heretofore been proposed, however, for using male and female cutters, it has been impossible to obtain localization of lengthwise tooth bearing. The gears have had full lengthwise tooth bearing and have, therefore, been unable to accommodate themselves to variations in mountings or loads. Further than this, with such prior methods, it has been difficult, if not impossible, where one member of a gear pair is form-cut and the other member is generated conjugate to the form-cut gear, to get smooth tooth space bottoms in that member of the gear pair which is cut with the straddle cutter, because the bottom of each tooth space of that gear is cut with two different rows of blades in two different cycles.

One object of the present invention is to provide a method for producing longitudinally curved tooth gears in which one member of the pair may be cut with a conventional male cutter and the other member may be straddle-cut but with which the gears may be so cut as to mesh with localized lengthwise tooth bearing when run together.

Another object of the invention is to provide a method for cutting longitudinally curved tooth gears in which one member may be form-cut and the other member generated conjugate to it, and in which the form-cut member may be straddle-cut satisfactorily.

A further object of the invention is to provide a method and a cutter for straddle-cutting one member of a pair of longitudinally curved tooth gears, where one member is form-cut and the other is generated conjugate to it, through which satisfactory and improved tooth space bottoms may be cut on the straddle-cut member.

Another object of the invention is to provide a method and a cutter for cutting one member of a pair of gears, where one member is form-cut and the other member is generated conjugate to it, in which one member may be produced with a straddle cutter in such way that the two sets of cutting edges which straddle a tooth describe more clearly the same tooth space bottom than has heretofore been possible.

Still another object of the invention is to provide a pair of male and female cutters for cutting longitudinally curved tooth gears which have matching cutting profiles and radially adjustable blades and with which the same length of tooth bearing can be obtained on a pair of gears regardless of the pitch of the gears, that is, regardless of the point-width to which the cutters may be adjusted.

Other objects of the invention will be apparent hereinafter from the specification and from the recital of the appended claims.

In the drawings:

Fig. 1 is a fragmentary plan view illustrating diagrammatically certain relationships between a pair of high reduction hypoid gears such as may be cut according to the present invention;

Fig. 2 is a fragmentary sectional view of a straddle cutter made according to one embodiment of this invention and illustrating diagrammatically certain relationships between this cutter and the gear which is to be cut thereby;

Fig. 3 is a fragmentary axial sectional view of the male cutter, which is employed in cutting the mating member of the pair, and illustrating certain relationships between this cutter and the gear which is to be cut thereby, and between this cutter and the female cutter;

Figure 6:
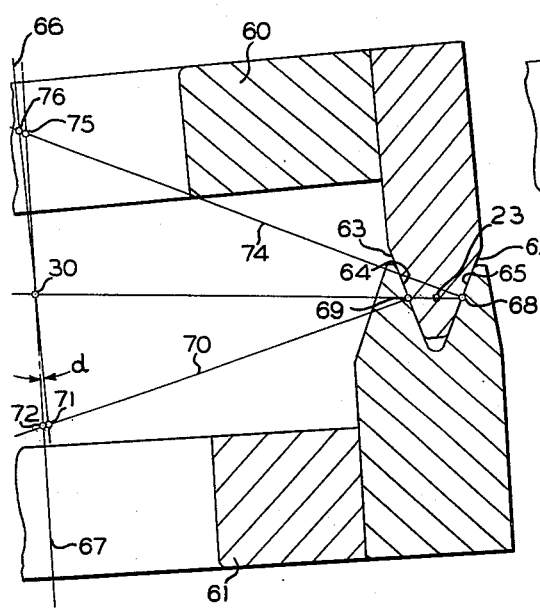
Fig. 6 is a fragmentary axial sectional view showing the relationship between the two cutters employed in cutting a pair of gears according to this invention, where the straddle cutter is used in the generation of the tooth surfaces of the pinion.

Referring now to the drawings by numerals of reference, 20 and 21 (Fig. 1) denote, respectively, the conical pitch surfaces of a pair of hypoid gears such as may be cut according to this invention. The pitch surfaces of these gears contact at a point 23 which is a mean point of the mean lengthwise tooth curve 24 of the gear 20. The plane of the drawing of Fig. 1 coincides with a plane tangent to the pitch surfaces of the two gears at mean point 23. 26 and 27 denote the projections of the gear and pinion axes, respectively, to this tangent plane. They intersect the tangent plane at points 28 and 29, respectively. The lengthwise tooth curve 24 may be cut by a face-mill cutter whose axis intersects the tangent plane at 30. The line 31 denotes the projection to the tangent plane of a normal to the tooth spiral 24 at mean point 23.

Figs. 2 and 3 illustrate the structure of a pair of cutters such as may be employed in cutting the gears 20 and 21. Where the gear or larger member of the pair 20 is to be form-cut and not subsequently ground, a straddle cutter, such as shown at 35 in Fig. 2, is preferably employed in cutting its tooth surfaces. This is a novel feature of the present invention, for heretofore it has always been considered desirable to cut the gear with the male cutter and the pinion with the female cutter.

The cutter 35 comprises a rotary head, an outer series of circularly-arranged cutting blades 36, and an inner series of circularly-arranged cutting blades 37. These blades may be integral with the cutter head or may be mounted in slots provided in the cutter head. In the latter case, the blades are preferably arranged in pairs and a pair of outside and inside blades is preferably mounted in each slot of the cutter head. The blades have their cutting portions projecting from one side face of the head in general direction of the axis 40 of the cutter. The blades 36 have inside cutting edges 38 and the blades 37 have outside cutting edges 39. The outside cutting edges 39 are closer to the cutter axis 40 than the inside cutting edges 38. The blades 36 and 37 are, therefore, so arranged radially with reference to one another that they will straddle a tooth of the work and their side-cutting edges 38 and 39 wil cut, respectively, opposite sides of that tooth as the cutter rotates on its axis 40 in engagement with the work.

The straddle cutter may have side-cutting edges of straight profile or of curved profile. In the embodiment shown in Fig. 2, the side-cutting edges 38 and 39 are of curved profile shape. In the embodiment shown in Fig. 4, the cutter 35' has side-cutting edges 38' and 39' on its blades 36' and 37' which are of straight profile shape. Fig. 2 may be considered a section through cutter and gear in a plane containing the normal 31 (Fig. 1), while Fig. 3 may be considered a similar section and relates to the cutting of the mating pinion.

Figure 4:
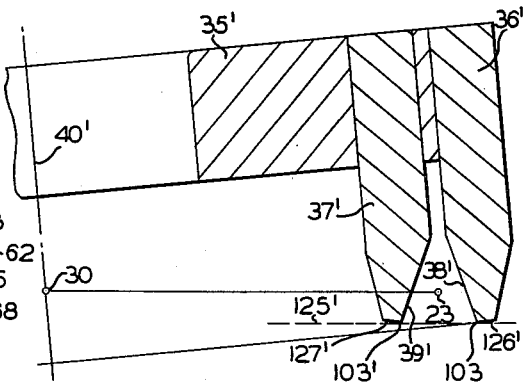
Fig. 4 is a fragmentary axial sectional view of a modified form of straddle cutter made for practicing this invention.

The cutters shown in Figs. 2 and 4 are constructed to be tilted with respect to the line 30—23, which is the projection into the tangent plane of the normal to the mean tooth spiral 24. The outside cutting edges 39 or 39' are, therefore, more inclined to the cutter axis 40 or 40' than the inside cutting edges 38 or 38'. This is the direct opposite of the constructions heretofore employed in straddle-type cutters. The effect of this construction will be explained hereinafter.

In Figs. 2 and 3, 45 denotes the intersection of the axis 26 of the gear 20 with the plane normal to the tooth spiral 24, that is, with a plane passing through the normal 31 and containing cutter axis 40. The cutter axis 40 is inclined to a line 23—45 connecting the mean point 23 with the intersection point 45, but the cutter axis is less inclined to line 23—45 than line 30—45. Preferably the cutter axis 40 is inclined so as to intersect the line 23—45 at a point beyond the point 45.

Where curved side-cutting edges are used, they may be circular arcs or involutes. Their centers of curvature are preferably at points which are the projection of the point 45 to the normals to these side-cutting edges. Thus, as shown in Fig. 2, the center of curvature for the cutting edge 38 is preferably at a point 46 which is the projection of the point 45 to the normal 47 to the cutting edge 38. This structure is of advantage as regards the adjustment characteristics of the gear pair.

For form-cutting the gear 20, the cutter 35 or 35' is preferably rotated on its axis 40 or 40' in engagement with the work while being fed depthwise relatively into the work. As the cutter revolves and is fed into depth, its side-cutting edges 38 and 39 or 38' and 39' will straddle a tooth of the work and finish-cut opposite sides of that tooth. When a tooth has been finished, the cutter is withdrawn from engagement with the work and the work is indexed to bring another tooth of the work into position where it can be cut when the rotating cutter is fed back into engagement with the work.

Figure 5:
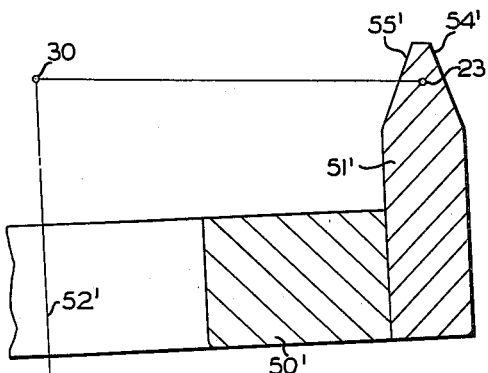
Fig. 5 is a fragmentary axial sectional view of the male cutter which is adapted to be used in cutting the gear that is to mate with the gear cut by the cutter of Fig. 4.

If the gear 20 is form-cut, the mating pinion 21 is generated conjugate to it in a generating operation in which the cutter represents a tooth of the gear 20. Fig. 3 shows a cutter 50 such as may be employed in cutting a pinion conjugate to the gear cut with the straddle cutter 35 of Fig. 2. Fig. 5 shows a cutter 50' such as may be employed in cutting a pinion conjugate to the gear cut with the straddle cutter 35' of Fig. 4. The cutter 50 or 50' employed in this operation may be a conventional, male type cutter comprising a rotary head and a plurality of cutting blades 51 or 51' that are arranged circularly about the axis 52 or 52' of the head and that have their cutting portions projecting beyond one side face of the head in the general direction of the axis of the head. The side-cutting edges of the blades of the pinion cutter will substantially match the side-cutting edges of the blades of the cutter used in the production of the gear. Thus, the side-cutting edges 54 and 55 of the blades 51 of cutter 50 will be of convex profile shape when the side-cutting edges 38 and 39 of cutter 35 are of concave profile shape, while the side cutting edges 54' and 55' of the blades of cutter 50' are of straight profile shape substantially matching the profiles of the cutting edges of cutter 35'. The convex profiles 54 and 55 of cutter 50 may, however, be somewhat less curved than the concave cutting edges 38 and 39 to produce ease-off at the tops and bottoms of the mating tooth surfaces of the two gears. Ease-off at the tops and bottoms of the mating tooth profiles of gears cut with the cutters 35' and 50' may be obained by making the side-cutting edges of the pinion cutter slightly concave or by using slightly concave profiles on both gear and pinion cutters. Each blade of cutter 50 or 50' may have opposite side-cutting edges 54 and 55 or 54' and 55', but preferably the opposite side-cutting edges will be provided on alternate blades as is conventional practice.

In the generation of the pinion, the cutter is rotated in engagement with the work while a relative rolling motion is produced between the cutter and work about the axis 26 of the gear as if the pinion were meshing with the gear. In this rolling motion, the work may be rotated on its axis 27 and either cutter or work may be simultaneously swung about axis 28. When one tooth space of the pinion blank has been generated, the cutter is withdrawn from engagement with the blank and the blank indexed.

Fig. 6 shows a pair of cutters made to practice the present invention where the conventional male cutter 60 is to be used to form-cut the gear or larger member of the pair and the pinion is to be generated with a female cutter 61. Here both cutters are shown as having straight cutting profiles, the cutter 60 having outside cutting edges 62 and inside cutting edges 63 and the cutter 61 having outside cutting edges 64 and inside cutting edges 65. The two cutters shown have fully matching cutting profiles. The cutters are so positioned relative to the work that in each case the line 23—30 is equally inclined to the outside and inside cutting edges of each cutter. In other words, the axis of each cutter is so inclined to the gear that is to be cut that the opposite side-cutting edges of that cutter have equal inclination to a plane tangent to the pitch surface of that gear at a mean point of contact between the gears. The outside cutting edge 62 of cutter 60 includes a larger angle with the axis 66 of that cutter, however, than the inside cutting edge 63.

An important new feature of the present invention is that the two cutter axes 66 and 67 have different inclinations to the tangent plane in cutting, that is, when the two cutters are interengaged as shown in Fig. 6, their axes are inclined to one another at an angle $d$ and they do not coincide as in prior constructions. The axes intersect preferably in a point which corresponds to the point 30 of line 23—30. This line is equally inclined to the opposite side-cutting profiles of both cutters and passes through their mean points 68 and 69. The inclination of the cutter axes to one another is such that the cutter bodies converge toward one another away from the mean point 23 in the direction of point 30, that is, in a direction diametrically across the cutters. It is this construction which insures that the gears, which are cut with the cutters, will have enough mismatch longitudinally between their mating tooth surfaces to give a desired localization of lengthwise tooth bearing. This will be apparent from the following explanation.

The normal 70 at mean point 69 intersects the cutter axes 66 and 67 at points 71 and 72, respectively. Distance 69—71 is the radius of curvature of the inside conical cutting surface of cutter 60 in a normal section perpendicular to the axial plane of the cutter. Distance 69—72 is the corresponding radius of curvature of the outside conical surface of the straddle cutter 61. With the angles shown, distance 69—71 is smaller than distance 69—72. The inside conical cutting surface of cutter 60, has therefore, a smaller radius of curvature and is more curved than the corresponding outside conical cutting surface 64 of cutter 61. The inside conical cutting surface of cutter 60 will produce longitudinally convex tooth surfaces on the gear, therefore, which are more curved lengthwise than the mating longitudinally concave tooth surfaces of the pinion cut with outside cutting surface 64 of cutter 61. Likewise, the normal 74 at mean point 68 intersects the axes 66 and 67 in points 75 and 76, respectively. Hence, the outside cutting surface 62 of cutter 60, which cuts the longitudinally concave surfaces of the gear teeth, is of greater radius of curvature than the inside cutting surface 65 of cutter 61, which cuts the mating longitudinally convex tooth surfaces of the pinion. Thus, there is mismatch between the mating tooth surfaces of gear and pinion and the desired lengthwise localization of tooth bearing between the mating tooth surfaces is obtained.

Figure 7:
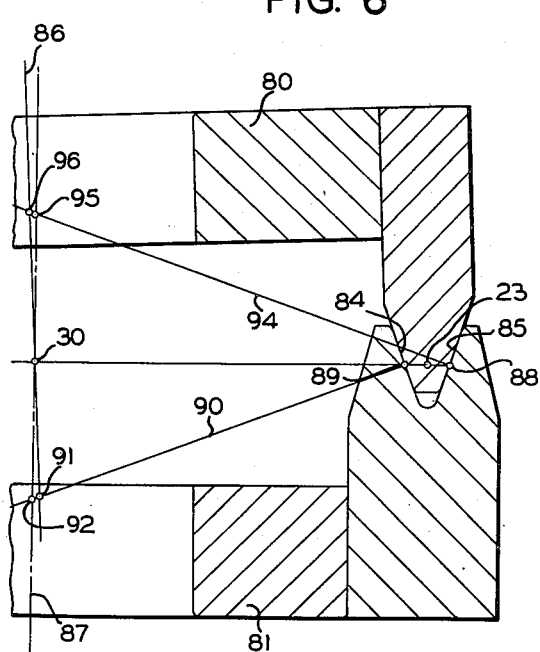
Fig. 7 is a similar view showing the relationship between the cutters where the straddle cutter is of somewhat modified construction.

The cutters shown in Fig. 7 differ from the cutters shown in Fig. 6 only in so far as the axis 87 of the straddle cutter 81 is perpendicular to the line 23—30, that is, to the tangent plane. The line 23—30 is again equally inclined, however, to the cutting profiles 84 and 85 of this cutter. The male cutter is denoted at 80. 88 and 89 denote mean contact points of the matching cutting profiles of the two cutters. 90 and 94 are the normals at these mean contact points. 91 and 92 are the points of intersection of the normal 90 with the cutter axes 86 and 87, respectively, while 95 and 96 are the points of intersection of the normal 94 with these axes.

The cutters shown in Figs. 2 to 5 inclusive are also constructed like the cutters shown in Figs. 6 and 7 to produce gears having lengthwise localization of tooth bearing. In all of these embodiments, when the cutters are interengaged, the axis of the male cutter is inclined to the axis of the female cutter in a direction to produce localization of the lengthwise tooth bearing in the pair of gears produced by these cutters.

The ease-off Z obtained at the outer and inner ends of the mating tooth surfaces of the gears may be determined as follows; when F denotes the length of the gear tooth 24, $r_i$ denotes distance 69—71, and $r_o$ denotes distance 69—72 at point 69, $r_i$ designates distance 68—75 and $r_o$ denotes distance 68—76 at point 68, then:

$$Z = \left(\frac{F}{2}\right)^2 \cdot \frac{1}{2}\left(\frac{1}{r_i} - \frac{1}{r_o}\right) = 1/8 F^2 \cdot \frac{r_o - r_i}{r_o r_i}$$

and $$\frac{r_o - r_i}{r_o r_i} = \sin \varphi \cdot \frac{\tan d}{r}$$

approximately where $\varphi$ denotes the pressure angle 30—69—71 or 30—68—75 and $r$ designates distance 23—30. Hence:

$$Z = \frac{F^2}{8r} \cdot \tan d \sin \varphi$$

$$\tan d = Z \cdot \frac{8r}{F^2 \sin \varphi}$$

It should be noted that $d$, which is the angle between the axes of the two cutters, is independent of the pitch. With a given ease-off $Z$ at a given tooth length $F$, $d$ depends only on the cutter radius $r$ and the pressure angle $\varphi$.

Figure 8:
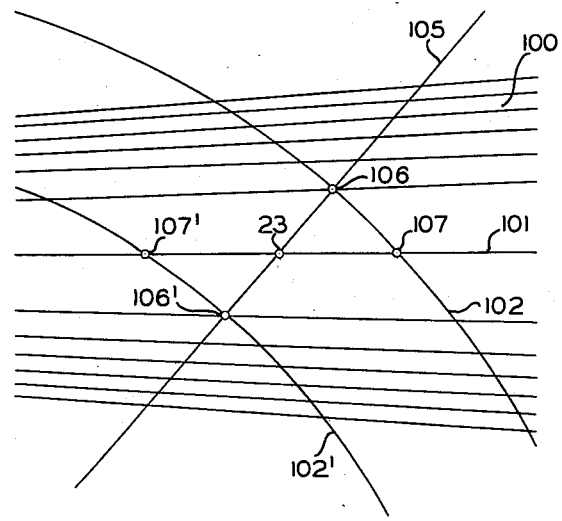
Fig. 8 is a diagrammatic view of the root plane of a tapered gear cut with a straddle cutter according to the present invention.

Another feature of the invention will now be described. Fig. 8 is a diagrammatic view of the root plane of a tapered gear cut with a straddle cutter. The root plane is the plane tangent to the root surface 100 at a point below mean point 23. The root surface may be considered a conical surface and is shown as such by the shading. Fig. 8 can also be considered the face plane of a tapered gear represented by a straddle cutter for generating the pinion.

The conical surface 100 contacts with the said root or said face plane along an element 101 which passes through projected mean point 23. 102 and 102' denote the paths of opposite end points of the straddle cutter as, for instance, the points 103 and 103' of the cutter shown in Fig. 4.

It will first be assumed that the cutter axis 40' is perpendicular to the said plane so that the paths 102 and 102' lie in said plane. The paths 102 and 102' intersect normal 105 at points 106 and 106', and they intersect element 101 at points 107 and 107'. If we consider the surfaces of revolution obtainable by rotating the paths 102 and 102' about the gear axis, the surface described by path 102 is tangent to the conical surface 100 at point 107; and the surface described by path 102' is tangent to this conical surface at 107'.

Figure 9:
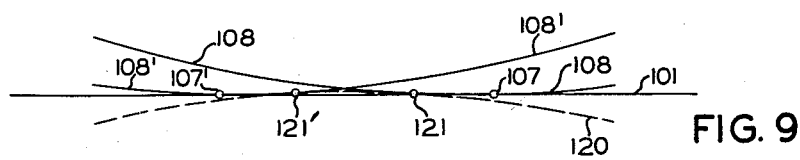
Fig. 9 is a diagrammatic view showing the profiles of the surfaces of revolution, which are swept out by this cutter in its rotation, in an axial section of the gear.

Fig. 9 shows the profiles 108 and 108' of an axial section through these surfaces of revolution. They contact the straight line element 101 of the conical surface 100 at points 107 and 107', respectively, and diverge from said element on both sides of the point of contact. At the tooth ends the distance of curves 108 and 108' from straight line 101 is quite different. The difference is the difference in tooth depth.

Figure 11:
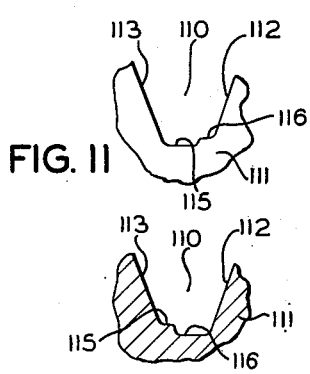
Figs. 11 and 12 are an end elevation and a sectional view, respectively, looking at the outside and the inside end of a tooth space, respectively, of a longitudinally curved tooth non-generated gear cut according to prior practice.
Figure 12:

Figs. 11 and 12 show the two ends of a tooth space 110 of a form-cut gear 111 which has a curved pitch surface and longitudinally curved teeth as produced by the methods heretofore employed. Fig. 11 shows the outside end of the tooth space, which on tapered gears is the large end, and Fig. 12 shows the inside of the tooth space which on tapered gears is the small end. In straddle-cutting, one side 112 of the tooth space is cut in one cycle and the opposite side 113 of the tooth space is cut in a separate cycle after the work has been indexed relative to the cutter. If the gear is straddle-cut by known processes, then at the large end of the tooth space, the path 115 cut by the tips of one set of blades of the cutter is deeper than path 116 cut by the tips of the other set of blades, whereas at the opposite end of the tooth space, as shown in Fig. 12, the relationship of the depth of the paths is reversed and the path 116 is deeper. The result is that there is a step formed in the bottom of the tooth space along the whole of its length. This step shifts from one side of the tooth space to the other along the length of the tooth space. This step in the tooth bottom is not only a flaw as regards looks, but it also may be a source of cracks, thus reducing the strength of the gear and the load which it can carry.

In the present invention, there are two remedies offered for this condition.

Figure 10:
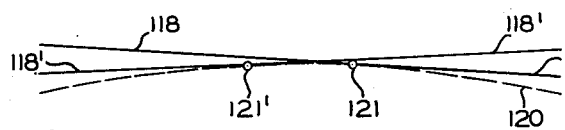
Fig. 10 is a similar view showing the profiles when a somewhat different form of cutter is employed.

One is to incline the cutter axis to the root plane so as to cause the path 102 and 102' to follow more nearly the conical root surface 100. The paths then remain tangent to the old paths at points 106 and 106' where they are perpendicular to the normal 105 and tangent to the root plane. The cutter axis is shown inclined in Figs. 2, 4 and 6. With inclination of the cutter axis at other than right angles to the root plane, the axial profiles of the paths 102 and 102' may be straightened out as indicated at 118 and 118' in Fig. 10. This reduces the difference in depth of the two paths at the tooth ends.

If the cutter axis were to coincide with the line 30—45 (Fig. 2), it would intersect the gear axis at point 45. The paths 102 and 102' would then lie in the same surface of revolution about the gear axis, that is, in a sphere centered at 45. The profile of this sphere is indicated in dotted lines at 120 in Figs. 9 and 10. It is tangent at 121 and 121' to the various axial profiles. With this position of the cutter axis, the cutter would cross the gear face in one part of the tooth zone of the gear and recross the tooth face in another part of the tooth zone, and would reach to the same depth in both crossings. This would mutilate the teeth and therefore cannot be used. There must be inclination of the cutter axis 40 (Fig. 2) to line 30—45. It is made as small as compatible with a single crossing of the gear face. While the difference in depth of the two cuts at the two ends of a tooth space can be reduced, therefore, with the above procedure, it cannot be eliminated entirely.

The further remedy is to improve the tooth bottoms even though on the non-generated (form-cut) gear or the pinion conjugate thereto, there is some change in depth in the two cutter paths along the length of a tooth space. This remedy is achieved by using cutters such as shown in Figs. 2 and 4. Here, the tip-cutting edges of the straddle blades are inclined to each other and to a line passing through their extreme tip points. Thus, as shown in Fig. 2 the tip edges 126 and 127 of the blades 36 and 37 are oppositely inclined to a line 125 containing the extreme points of these edges. Likewise, in Fig. 4 the tip edges 126' and 127' of the blades 36' and 37' are oppositely inclined to a line 125' containing the tip points 103 and 103' of these blades, the tip cutting edges 126' lying in an external conical surface coaxial of the cutter, and the tip cutting edges 127' lying in an internal conical surface coaxial of the cutter. The blades cut deepest, therefore, at their extreme points, such as the points 103 and 103'. The result obtained by use of such straddle cutters is shown in Figs. 13 to 15 inclusive.

Figure 13:
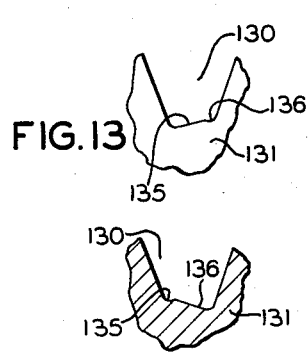
Figs. 13 and 14 are similar views of a longitudinally curved tooth form-cut tapered gear cut according to this invention.
Figure 15:
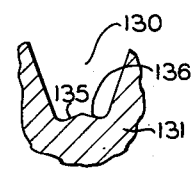
Fig. 15 is a sectional view through the middle of the tooth space of this gear.
Figure 14:
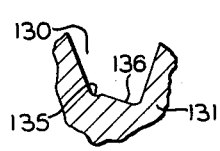

Figs. 13 and 14 show opposite ends of a tooth space 130 of a gear 131, whereas Fig. 15 shows a section taken mid-way the length of this tooth space. The two paths cut in the bottom of the tooth space by the tip-cutting edges of the cutter in the two successive cuts of the cutter are designated 135 and 136, respectively. In the center of the length of the tooth space, the tooth bottom has a symmetrical roof shape, whereas at the ends of the teeth, the ridge in the bottom of the tooth space shifts toward the shallow side of the tooth bottom. The superiority of tooth bottoms such as shown in Figs. 13 to 15 inclusive is at once apparent. With this design of cutter, therefore, teeth can be obtained which have maximum strength and with which danger of cracks and of breakage is materially reduced.

While the invention has been described in connection with a particular embodiment thereof and particular uses therefor, it will be understood that it is capable of further modification and use and that this application is intended to cover any variations, uses, or adaptations of the invention following, in general, the principles of the invention and including such departures from the present disclosures as come within known or customary practice in the art to which the invention pertains and as may be applied to the essential features hereinbefore set forth and as fall within the scope of the invention or the limits of the appended claims.

Having thus described my invention, what I claim is:

1. A rotary face-mill gear cutter comprising a rotary head and two series of concentrically arranged cutting blades whose cutting portions project beyond one side face of the head in the general direction of the axis of the head, the blades of the inner series having side-cutting edges which are inclined toward the axis of the cutter from the base of the blades to their tips and the blades of the outer series having side-cutting edges which are inclined away from the axis of the cutter from the base of the blades to their tips, the side-cutting edges of the two series of blades being adapted to straddle and cut opposite sides of a gear tooth, the tip-cutting edges of the first described series of blades lying in an internal conical surface coaxial with the cutter, and the tip cutting edges of the other series of blades lying in an external conical surface coaxial with the cutter.

2. A rotary face-mill gear cutter having two series of concentrically arranged cutting blades which have outside and inside cutting edges, respectively, that are adjacent and are adapted to straddle and cut, respectively, opposite sides of a tooth, and which have tip-cutting edges, respectively, that are inclined to each other and have their extreme points at adjacent sides of the two series of blades, the outside cutting edges on one series of blades being more inclined to the cutter axis than the inside cutting edges on the other series of blades.

3. In combination, a pair of face-mill cutters for cutting, respectively, the mating members of a pair of gears, one of said cutters having circularly arranged cutting blades which project beyond one side face in the general direction of the axis of the cutter and which have outside and inside cutting edges adapted to cut, respectively, opposite sides of a tooth space of the work, and the other of said cutters having cutting blades which project beyond one side face in the general direction of the axis of the cutter and which are arranged in two concentric rows that are adapted to straddle a tooth of the work and that have outside and inside cutting edges adapted to cut, respectively, opposite sides of a tooth of the work, the inside cutting edges of each cutter matching in profile the outside cutting edges of the other cutter but being differently inclined to the axes of their respective cutters, the outside cutting edges of each cutter being more inclined to the axis of that cutter than the matching inside cutting edges of the other cutter are inclined to the axis of the latter cutter.

4. In combination, a pair of face-mill cutters for cutting, respectively, the mating members of a pair of gears, one of said cutters having circularly arranged cutting blades which project beyond one of its side faces in the general direction of the axis of the cutter and which have outside and inside cutting edges adapted to cut, respectively, opposite sides of a tooth space of the work, and the other of said cutters having cutting blades which project beyond one side face of the cutter in the general direction of the axis of the cutter and which are arranged in two concentric rows that are adapted to straddle a tooth of the work and that have outside and inside cutting edges adapted to cut, respectively, opposite sides of a tooth of the work, the inside cutting edges of each cutter matching in profile the outside cutting edges of the other cutter, one of said cutters having its outside and inside cutting edges equally inclined to its axis and the other of said cutters having its outside cutting edges more inclined to its axis than its inside cutting edges.

5. In combination, a pair of face-mill cutters for cutting, respectively, the mating members of a pair of longitudinally curved tooth gears, one of said cutters having circularly arranged cutting blades which project beyond one of its side faces in the general direction of the axis of the cutter and which have outside and inside cutting edges adapted to cut, respectively, opposite sides of a tooth space of one gear, and the other of said cutters having its cutting blades arranged in two concentric rows, the blades of said rows being adapted to straddle a tooth of the other gear and having adjacent inside and outside cutting edges, respectively, which are adapted to cut opposite sides of the teeth of said other gear, and having tip-cutting edges which are inclined to one another and which have their extreme points at said adjacent side-cutting edges, the inside cutting edges of each cutter matching in profile the outside cutting edges of the other cutter, and one of said cutters having its outside cutting edges more inclined to its axis than its inside cutting edges.

6. The method of cutting a longitudinally curved tooth gear which comprises employing a face-mill gear cutter, that has its cutting blades arranged in two concentric rows with inside and outside cutting edges at adjacent sides of the blades, and that has the outside cutting edges more inclined to the cutter axis than the inside cutting edges, engaging said cutter with the work so that the two rows of blades straddle a tooth of the work and so that the axis of the cutter is tilted to the pitch plane of the work so that the outside and inside cutting edges will cut tooth surfaces of equal pressure angle on opposite sides of the tooth, and rotating said cutter in engagement with the work, while holding the work stationary on its axis and effecting a relative depthwise feed movement between cutter and work, and periodically withdrawing the cutter from engagement with the work and indexing the work and repeating said operations.

7. The method of cutting a longitudinally curved tooth gear which comprises cutting its teeth with a face-mill gear cutter that has its cutting blades arranged in two concentric rows with inside and outside cutting edges at adjacent sides of said rows, and with the tip-cutting edges on one row of blades so inclined to the tip-cutting edges on the other row of blades that the extreme points of said tip-cutting edges are at the adjacent sides of the rows, by rotating said cutter in engagement with the work.

8. The method of cutting a longitudinally curved tooth gear which comprises cutting its teeth with a face-mill gear cutter that has its cutting blades arranged in two concentric rows with inside and outside cutting edges at adjacent sides of said rows, the outside cutting edges being more inclined to the cutter axis than the inside cutting edges and one row of blades having tip-cutting edges inclined to the tip-cutting edges of the other row of blades, the extreme points of the tip-cutting edges being at the adjacent sides of the rows, by rotating said cutter in engagement with the work while holding the work stationary on its axis and effecting simultaneously a relative depthwise feed movement between the cutter and work, and periodically withdrawing the cutter from engagement with the work and indexing the work, and repeating said operations.

9. The method of cutting a pair of longitudinally curved tooth gears which comprises employing for cutting the larger member of the pair a face-mill gear cutter which has outside and inside cutting edges, the outside cutting edges being more inclined to the cutter axis than the inside cutting edges, and employing for cutting the smaller member of the pair a face-mill gear cutter which has outside and inside cutting edges that match in profile shape the cutting edges of the first cutter, engaging each cutter with the work piece, which is to cut, so that the axis of the cutter is tilted to the pitch plane of that work piece at an angle such that the inside and outside cutting edges of the cutter will cut opposite side tooth surfaces on the work piece of equal pressure angle, and rotating the cutter, in each case, in engagement with the work, the cutter for cutting one of said gears having its outside and inside cutting edges arranged to straddle a tooth of the work and cut simultaneously opposite sides of that tooth, one of said gears, at least, being cut in a generating operation in which the cutter and work are rolled together as though the gear being cut were meshing with its mate gear represented by the cutter.

10. The method of cutting a pair of longitudinally curved tooth gears which comprises cutting each tooth of one member of the pair with a face-mill gear cutter that has two rows of concentrically arranged cutting blades with inside and outside cutting edges at adjacent sides of said rows, the outside cutting edges being of greater inclination to the cutter axis than the inside cutting edges, by positioning said cutter in engagement with the work so that the two rows of blades straddle a tooth of the work and so that the axis of the cutter is tilted to the pitch plane of the work to cut tooth surfaces of equal pressure angle on opposite sides of the tooth, and rotating the cutter on its axis while holding the work stationary on its axis and effecting a relative depthwise feed movement between the cutter and work, and cutting each tooth space of the other member of the pair by rotating a face-mill gear cutter, that has outside and inside cutting edges which match in profile the inside and outside edges, respectively, of the first cutter, in engagement with the work to cut opposite sides of a tooth space simultaneously, while effecting a relative rolling movement between the cutter and work as though the work were meshing with its mate gear, the second-named cutter having its axis tilted to the pitch plane of the work so that it will cut tooth surfaces of equal pressure angle on opposite sides of the teeth of the work.

11. The method of cutting a pair of longitudinally curved tooth gears which comprises cutting each tooth of one member of the pair with a cutter that has two rows of concentrically arranged cutting blades with inside and outside cutting edges at adjacent sides of said rows that lie in surfaces of revolution of different radii of curvature, and cutting each tooth space of the other member of the pair with a cutter that has circularly arranged cutting blades which have inside and outside cutting edges lying, respectively, in surfaces of revolution of different radii of curvature, the inside cutting surface of each cutter being of smaller radius than the outside cutting surface of the other cutter, by engaging each cutter with a work piece so that the axis of each cutter is tilted to the pitch plane of the work piece to be cut thereby, to cut opposite tooth surfaces of equal pressure angle on the work piece simultaneously, and rotating each cutter in engagement with the workpiece, the workpiece and cutter in one case, at least, being rolled relative to one another as though the gear being cut were meshing with its mate.

12. The method of cutting a pair of longitudinally curved tooth gears which comprises cutting one member of the pair with a face-mill gear cutter that has two concentric rows of cutting blades which have outside and inside cutting edges at adjacent sides of said rows, the outside cutting edges being more inclined to the cutter axis than the inside cutting edges, by tilting said cutter relative to the pitch plane of the work so that its opposite side-cutting edges will cut simultaneously tooth surfaces of equal pressure angle on opposite sides of a tooth of the work, and cutting the other member of the pair with a face-mill gear cutter that has inside and outside cutting edges matching in profile, respectively, the outside and inside cutting edges of the first tool, by positioning said cutter relative to the pitch plane of the work so that its opposite side-cutting edges will cut simultaneously tooth surfaces at opposite sides of a tooth space of the work which are of equal pressure angle, the cutter being rotated in engagement with the work in each case, and in one case, at least, the cutter and work being rolled relative to one another as though the gear being cut were rolling with another gear represented by the cutter.

13. The method of cutting a longitudinally curved tooth gear which comprises employing a face-mill gear cutter which has cutting blades arranged in two concentric rows with inside and outside cutting edges at adjacent sides of said rows, the outside cutting edges being more inclined to the cutter axis than the inside cutting edges, and with tip-cutting edges on the two rows that are oppositely inclined, the extreme points of said tip-cutting edges being at the adjacent sides of said rows, positioning said cutter in engagement with the work so that the two rows of blades straddle a tooth of the work and so that the axis of the cutter is tilted to the pitch plane of the work to produce tooth surfaces of equal pressure angle on the tooth, and rotating the cutter in engagement with the work, and periodically indexing the work.

14. The method of cutting a pair of longitudinally curved tooth gears which comprises cutting each tooth space of one member of the pair with a face-mill gear cutter, which has outside and inside cutting edges adapted to cut, respectively, opposite sides of a tooth space, by rotating said cutter in engagement with the work, and cutting the opposite sides of each tooth of the other member of the pair with a face-mill gear cutter which has outside and inside cutting edges adapted to cut, respectively, opposite sides of a tooth, by rotating said cutter in engagement with the work, one workpiece being held stationary on its axis during cutting action of its cutter and the other workpiece being rolled relative to the cutter during cutting action of its cutter, the inside cutting edges of each cutter matching in profile the outside cutting edges of the other cutter but being differently inclined to the axes of their respective cutters, the outside cutting edges of each cutter being more inclined to the axis of that cutter than the matching inside cutting edges of the other cutter are inclined to the axis of the latter cutter, and the axes of the two cutters being differently inclined, respectively, to planes tangent, respectively, to the pitch surfaces of the two workpieces during cutting of those work pieces.

15. The method of cutting a pair of longitudinally curved tooth gears which comprises cutting each tooth space of one member of the pair with a face-mill gear cutter, which has outside and inside cutting edges adapted to cut, respectively, opposite sides of a tooth space, by rotating said cutter in engagement with the work, and cutting the opposite sides of each tooth of the other member of the pair with a face-mill gear cutter which has outside and inside cutting edges adapted to cut, respectively, opposite sides of a tooth, by rotating said cutter in engagement with the work, one workpiece being held stationary on its axis during cutting action of its cutter and the other workpiece being rolled relative to the cutter during cutting action of its cutter, the inside cutting edges of each cutter matching in profile the outside cutting edges of the other cutter, one of said cutters having its outside and inside cutting edges equally inclined to its axis, and the other of said cutters having its outside cutting edges more inclined to its axis than its inside cutting edges, and the axes of the two cutters being differently inclined, respectively, to planes tangent, respectively, to the pitch surfaces of the two workpieces during cutting of those workpieces.

ERNEST WILDHABER.

REFERENCES CITED

The following references are of record in the file of this patent:

UNITED STATES PATENTS

| Number | Name | Date |
| --- | --- | --- |
| 1,376,600 | Blackmore | May 3, 1921 |
| 1,667,299 | Wildhaber | Apr. 24, 1928 |
| 1,676,371 | Wildhaber | July 10, 1928 |
| 1,725,037 | Wildhaber | Aug. 20, 1929 |
| 2,091,575 | Wildhaber | Aug. 31, 1937 |
| 2,310,484 | Wildhaber | Feb. 9, 1943 |
| 2,329,804 | Wildhaber | Sept. 21, 1943 |
| 2,353,768 | Shlesinger | July 18, 1944 |